United States Patent Office 3,308,097
Patented Mar. 7, 1967

3,308,097
PROCESS FOR THE PREPARATION OF POLYMERS HAVING A POLYESTER STRUCTURE
Gianfranco Pregaglia and Giancarlo Pozzi, Milan, Italy, assignors to Montecatini Edison S.p.A., Milan, Italy
No Drawing. Filed July 22, 1963, Ser. No. 296,470
Claims priority, application Italy, July 23, 1962, 14,721/62
19 Claims. (Cl. 260—63)

This invention relates to a process for the preparation of polymers having a polyester structure by the polymerization of ketene $CH_2=CO$. The macromolecular compounds obtained by the process of this invention have the following regular structure:

(I) 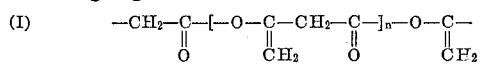

It is known that polyesters having the structure of Formula I may be obtained by polymerizing diketene. The formation of this polyester structure may be explained when the diketene is considered to be a methylenepropiolactone (II) 

so that the breaking of the lactone ring results in the repeating unit of the above mentioned polymer I.

It is also known that the direct utilization of ketene for preparing regular, high molecular weight polymers has not hitherto been possible, due to the high reactivity of the ketene, which causes the formation of pitchy products that cannot be easily identified.

It has been now discovered, quite surprisingly, that it is possible to polymerize ketene, under controlled reaction conditions, to obtain a linear polymer having the polyester structure of I. The formation of a polymer having the above-mentioned structure could not be foreseen because it is derived from the enchainment of monomeric units alternatively formed through the opening of the $C=C$ and $C=O$ bonds. The possibility that diketene of II may be a stable intermediate during the polymerization of the ketene has been rejected because of the fact that the diketene does not have a tendency to polymerize according to the process described herein.

The process of this invention is characterized by the use of a particular class of catalysts and by the nature of the reaction medium. The catalysts capable of polymerizing the ketene according to the above-mentioned process are compounds which act as anionic components under the reaction conditions. Particularly suitable are the basic compounds such as the hydroxides of the metals of Groups I and II of the Mendeleeff Periodic Table. These compounds include LiOH, NaOH, KOH, $Ca(OH)_2$ and $Ba(OH)_2$. In adidtion, some of the organic bases can also act as a catalyst provided that their basic constant is low enough. Thus, for example, one possible compound, in particular, is triphenylamine. Other compounds which act as anionic catalysts in the process of this invention, include the alkali metals and the alkaline earth metals, their oxides and hydrides. Still other substances include the organometallic compounds characterized by the formula $R_nMe$, where Me is a metal of the Groups I and II of the Mendeleeff Periodic Table, $n$ is the valence of the metal and R is an alkyl, aryl, alkoxy or an alkylcarboxylic group containing from 1 to 8 carbon atoms. In adidtion to these, basic aluminum oxide was found to be an active catalyst.

In regard to the reaction medium to be used with the catalyst in the process of this invention, it was found that its action is essential and the medium must contain a polar solvent having a dielectric constant of at least 8 or higher in order to obtain a high-rate of polymerization and a minimum of side reactions.

In fact, it was discovered that in the absence of any solvent the polymerization did not occur. Moreover, in the presence of a nonpolar solvent, when a heterogeneous catalyst was used, the ketene did not polymerize in any remarkable amounts. Still further, when a homogeneous catalyst was used the polymerization started but stopped quickly and a polymer was obtained which had a high ash content, an irregular structure and was soluble in methanol.

In comparison, by operating in accordance with the process of this invention i.e., in the presence of a polar solvent having a high dielectric constant only small amounts of the catalyst were needed to promote polymerization of the ketene at a high rate and with almost complete conversion. In fact, at times the alkalinity of the glass walls of the reactor was sufficient to start a partial polymerization.

However, the best reaction conditions were obtained when an insoluble catalyst selected from the above-identified anionic catalyst was used. In some instances, a catalyst may be used which becomes insoluble during the polymerization. This may be due to the catalyst reacting with the solvent. The amount of catalyst ranges from about 0.1 to 0.00001 gram of catalyst per gram of monomer.

It is preferred to use polar solvents which do not contain functional groups capable of reacting with the ketene under normal polymerization conditions. The preferred polar solvent for purposes of this invention include for example the ketones such as acetone, methylethylketone, cyclohexanone, and cyclopentanone. Other solvents include the anhydrides of acids such as, for instance, acetic anhydride and isobutiric anhydride. In addition, the nitriles such as acetonitrile and acrylonitrile have proved particularly suitable. It has been found that it is possible to work below the crystallization temperature of these solvents by using a mixture of compounds so that the dielectric constant of the solution is sufficiently high. For example, ketene can be added to a solution of ethyl ether and acetonitrile, which does not crystallize at temperatures at $-50°$ C., and thus it is possible to polymerize the monomer.

The temperature within which the polymerization of the ketene takes place ranges from about $-100°$ to $+20°$ C. but more preferably between $-100°$ and $-45°$ C. It is also important to note that the ketene used in the polymerization reaction, may be obtained directly from the pyrolysis of acetone or acetic acid, without the necessity of going through a particular purification process which is a costly intermediate operation.

The polyketenes obtained by the process of this invention have a crystallinity in excess of 40% and are soluble in warm chloroform, benzene and dioxane at temperatures of at least 40° C. These polyketenes have molecular weights ranging from about 500 to 5000 and melting points lower than 100° C.

It has been found that it is possible to mix the polyketenes of this invention with other polymers not easily dyed so that the reactivity of the methylene groups along the main chain of the polyketene impart the necessary affinity for the dyes.

The following examples are for purposes of illustrating the invention.

*Example 1*

Approximately 35 cc. of anhydrous acetone and 2 grams of KOH pellets were introduced into a 250 cc. three-necked flask provided with a mechanical stirrer and cooled to a $-70°$ C. A gas stream coming from an apparatus for acetone pyrolysis was bubbled into the flask. A white precipitate was formed which quickly increased to the extent that the reaction mixture became a pasty mass. After about 1½ hours the gas stream was interrupted and the mass was treated with acetone which had been previously cooled. The KOH pellets were mechanically separated, and the polymerization mass was poured into methanol. After a quick filtration, the mass was thoroughly washed with methanol and dried. Approximately 14.4 grams of the polymer were obtained which indicates that approximately 75% of the monomer was converted. The crude polymer was found to be soluble in chloroform, dioxane, tetrahydrofurane, but insoluble in ether, heptane and cyclohexane.

The melting point of the product as determined on a copper block was about 60° C. The polymer was noticed to release gaseous products at temperatures only in excess of 100° C. This particular polymer had a molecular weight of about 1,000, as determined by the cryoscopic method in dioxane, and under an X-ray examination clearly exhibited crystallinity. The I.R. spectrum showed absorption bands at 5.65 microns which may be attributed to the C=O bonds and at 8.85 microns which may be attributed to the C—O—C group. The band at 5.99 microns may be attributed to the $CH_2$=C bond.

*Examples 2–11*

Into a 100 cc. glass tube provided with a side cock for the introduction of nitrogen, the catalyst and a solvent in an amount, by volume, twice the amount of ketene were introduced under an inert atmosphere. The ketene was distilled while keeping the reaction mass at a temperature of a −78° C. The polymer obtained was washed with methanol and dried. The following table lists the data of the various tests.

the Mendeleeff Periodic Table, $n$ is the valence of the metal, and R is selected from the group consisting of alkyl and alkoxy groups containing 1 to 8 carbon atoms;
(c) alkali metals, oxides, and hydrides;
(d) alkaline earth metals, oxides, and hydrides;
(e) triphenylamine and
(f) basic aluminum oxide
at a temperature ranging from about −100 to +20° C.

2. The process of claim 1 further characterized in that the polar solvent is a ketone.
3. The process of claim 2 further characterized in that the polar solvent is acetone.
4. The process of claim 2 further characterized in that the polar solvent is cyclohexanone.
5. The process of claim 2 further characterized in that the polar solvent is methylethylketone.
6. The process of claim 1 further characterized in that the anionic catalyst is a hydroxide of a metal of Groups I and II of the Mendeleeff Periodic Table.
7. The process of claim 6 further characterized in that the anionic catalyst is lithium hydroxide.
8. The process of claim 6 further characterized in that the anionic catalyst is potassium hydroxide.
9. The process of claim 1 further characterized in that the anionic catalyst is an organometallic compound having the formula $R_nMe$ wherein Me is a metal of Groups I and II of the Mendeleeff Periodic Table $n$ is the valence of the metal and R is selected from the group consisting of alkyl, and alkoxy containing from 1 to 8 carbon atoms.
10. The process of claim 9 further characterized in that R is an alkyl group.
11. The process of claim 9 further charatcerized in that the R is an alkoxy group.

TABLE 1

| Example No. | Monomer, cc. | Catalyst | Solvent | Conversion of monomer, percent | Reaction time, hrs. |
|---|---|---|---|---|---|
| 2 | 12 | $LiC_4H_9$, $6.10^{-3}$ mols | Acetone | 8.8 | 0.5 |
| 3 | 14 | $LiC_4H_9$, $6.10^{-3}$ mols | Cyclohexanone | 7.8 | 1.5 |
| 4 | 14 | $LiC_4H_9$, $6.10^{-3}$ mols | Methylethylketone | 12 | 1 |
| 5 | 9 | $C_4H_9OLi$, $5.10^{-3}$ mols | Acetone | 1.2 | 1 |
| 6 | 8 | $CH_3ONa$, $10.10^{-3}$ mols | ___do___ | 8.7 | 3 |
| 7 | 8 | LiOH, $8.10^{-3}$ mols | ___do___ | 26 | 48 |
| 8 | 10 | $Al_2O_3$ (basic), $8.10^{-3}$ mols | ___do___ | 20 | 1 |
| 9 | 8 | Li, $2.10^{-3}$ mols | ___do___ | 21.5 | 16 |
| 10 | 8 | K, $4.10^{-3}$ mols | ___do___ | 21.5 | 24 |
| 11 | 10 | Na-isoamyl, $5.10^{-3}$ mols | ___do___ | 8.5 | 6 |

While this invention has been described with respect to a number of specific examples, it is understood that other variations and modifications may be used without deparing from the spirit and scope of the invention, except as recited in the appended claims.

What is claimed is:

1. A process of preparing ketene polymers having essentially a polyester structure having the formula:

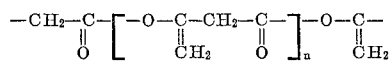

which comprises polymerizing ketene in a reaction medium containing a polar solvent selected from the group consisting of ketones, acid anhydrides, nitriles and mixtures thereof having a dielectric constant of at least 8 and in the presence of 0.1 to 0.00001 part by weight per part by weight of monomer of an anionic catalyst selected from the group consisting of
  (a) hydroxides of metals from Groups I and II of the Mendeleeff Periodic Table;
  (b) organometallic compounds having the formula $R_nMe$ where Me is a metal of Groups I and II of 12. The process of claim 10 further characterized in that the catalyst is butyl-lithium.
13. The process of claim 10 further characterized in that the catalyst is amyl sodium.
14. The process of claim 11 further characterized in that the catalyst is lithium butylate.
15. The process of claim 11 further characterized in that the catalyst is sodium methylate.
16. The process of claim 1, further characterized in that the anionic catalyst is an alkali metal.
17. The process of claim 16 further characterized in that the alkali metal compound is lithium.
18. The process of claim 16 further characterized in that the alkali metal compound is potassium.
19. The process of claim 1 further characaterized in that the anionic catalyst is basic alumina.

References Cited by the Examiner

FOREIGN PATENTS 893,308   4/1962   Great Britain.

WILLIAM H. SHORT, *Primary Examiner.*

C. A. WENDEL, *Assistant Examiner.*